Sept. 22, 1964 M. S. BAUM ET AL 3,149,555
MIXING AND PUMPING APPARATUS
Filed April 26, 1962 3 Sheets-Sheet 1

INVENTORS
*Frank R. Moreo &*
*Morton S. Baum*

Sept. 22, 1964    M. S. BAUM ETAL    3,149,555
MIXING AND PUMPING APPARATUS
Filed April 26, 1962    3 Sheets-Sheet 2

INVENTORS
Frank R. Moreo &
Morton S. Baum

Sept. 22, 1964  M. S. BAUM ETAL  3,149,555
MIXING AND PUMPING APPARATUS
Filed April 26, 1962  3 Sheets-Sheet 3

INVENTORS
Frank R. Moreo &
Morton S. Baum

United States Patent Office 3,149,555
Patented Sept. 22, 1964

3,149,555
MIXING AND PUMPING APPARATUS
Morton S. Baum, 1504 N. 40th Ave., Hollywood Hills, Fla., and Frank R. Moreo, 6432 SW. 22nd Court, West Hollywood, Fla.
Filed Apr. 26, 1962, Ser. No. 190,383
5 Claims. (Cl. 99—257)

This invention relates to an apparatus designed for the treatment of various cuts of meat and more particularly is directed to a machine for use in stitch pumping a fluid composition into various cuts of meat.

At the present time, numerous methods of meat tenderization are well known. In the application of tenderizer to meats by the retail user, powdered or salted tenderizer compound is most commonly used. When the wholesaler or packer tenderizes the meat, the process used at the present time is that generally known as dipping, wherein the various cuts of meats are dipped into a solution of tenderizer and therefore absorb a certain amount of tenderizer which reacts on the meat tissues. One other type of tenderizing process has come into use today, and that is the pumping of a brine or salt solution into the blood vessels of a live animal just prior to slaughter.

All of the above methods of tenderizing have various drawbacks and limitations which may be due to the extreme complexity of applying the tenderizers or the lack of complete tenderization of the meat. The present invention provides a machine wherein various cuts of meat, such as the loins, may be injected with a solution which contains tenderizer and may also contain beef or vegetable fats and various flavoring agents in order to tenderize, flavorize and marbleize the particular cuts of meat. The advantage of this treatment is obvious since one may reach all portions of the meat and provide substantially equal treatment thereof thus producing a cut that is superior in all respects to cuts of meat tenderized in any other fashion.

A process known as stitch pumping, wherein various needles having orifices therein are injected into a particular piece of meat and a solution is injected under pressure into the meat, has normally been associated in the past with the use of brine in treatment of various products such as corned beef for pickling purposes. This basic needle and pumping feature has been incorporated in the present invention to provide apparatus for the injection into various cuts of meat of a tenderizing, flavorizing and marbelizing fluid to produce a superior piece of meat from one of the lower grade cuts of meat. The apparatus is particularly well adapted for use with the composition disclosed in copending U.S. Patent application Serial No. 121,839 filed in the name of the present inventors.

Accordingly, an object of this invention is to provide an apparatus for the injection of a fluid composition into various cuts of meat.

A further object of the invention is to provide apparatus for the stitch pumping of meat wherein the fluid is not only mixed and circulated in the apparatus but may also be used for the treatment of meat.

A still further object of the invention is to provide apparatus for the mixing and retaining in an emulsified state of a particular fluid for the treatment of meat.

Yet another object of this invention is to provide apparatus for employing a plurality of interconnected reservoirs containing a fluid for the treatment of meat and associated apparatus for use of said fluid.

A further object of this invention is to provide an apparatus for heating, mixing and retaining, in a emulsified state, fluid for the treatment of meat.

A still further object of this invention is to provide apparatus for heating, emulsifying and pumping a composition for the treatment of meat.

These and other objects will become apparent from the following description when taken in conjunction with the drawings wherein.

Figure 1:
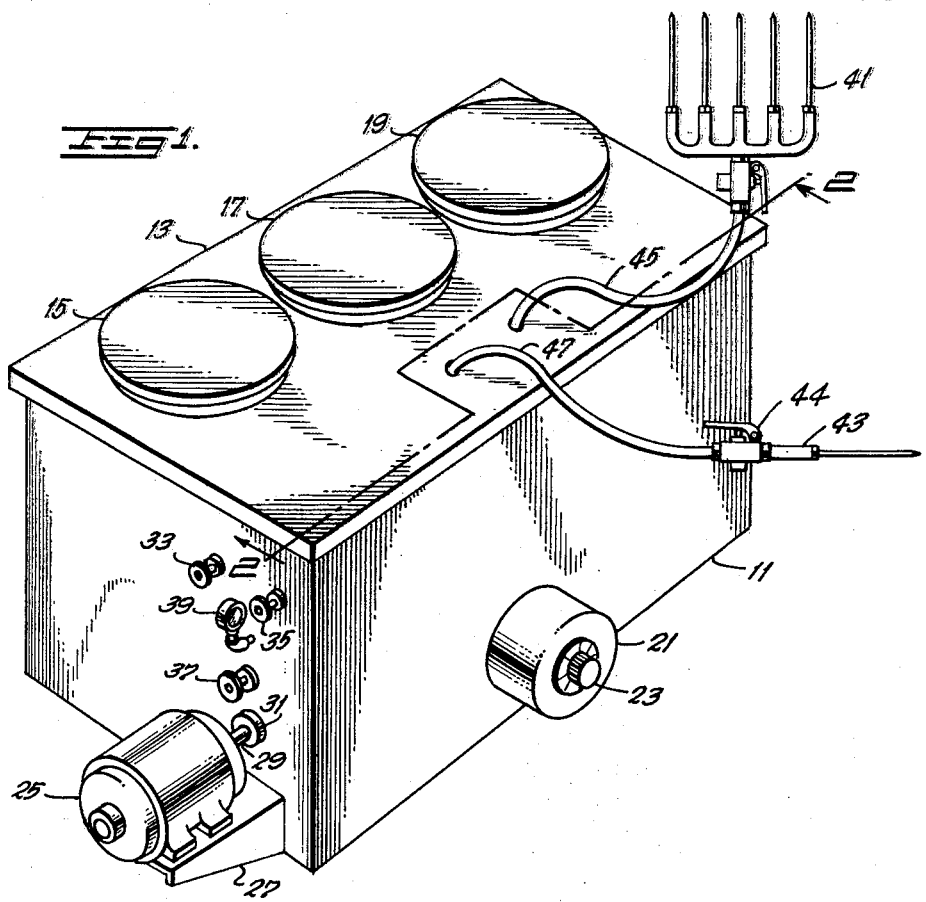
FIG. 1 is a perspective view of the apparatus of the present invention.
Figure 4:
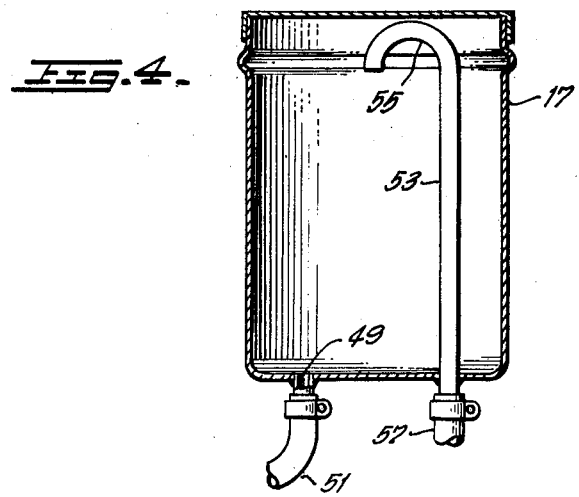
FIG. 4 is an enlarged detailed sectional view of one of the containers used in the present invention.

Turning now more specifically to the drawings, FIG. 1 shows the basic tank 11 having a removable cover 13 thereon. Inserted into apertures in the cover are three containers 15, 17 and 19. A heater 21 with associated thermostat 23 is secured within the tank 11 and extends outwardly thereof for control of the particular temperature desired within the tank.

A motor 25 is mounted on a support 27 which is attached to the side of the tank 11. The motor has a shaft 29 extending through the side of the tank by means of a watertight seal 31 for purposes which will become apparent as the description proceeds. Various control knobs 33, 35 and 37 also extend outwardly from the tank and have their associated water tight seals. The purpose of the control knobs will also be described in detail as the description proceeds.

A fluid pressure gauge 39 extends outwardly from the tank in order to provide an indication of the pressure existing in the various pumping operations which ultimately lead to the hoses 45 and 47 extending upwardly through the cover 13 and terminate in pumping devices such as the five-needle stitch pump 41 and the single-needle stitch pump 43.

Figure 2:
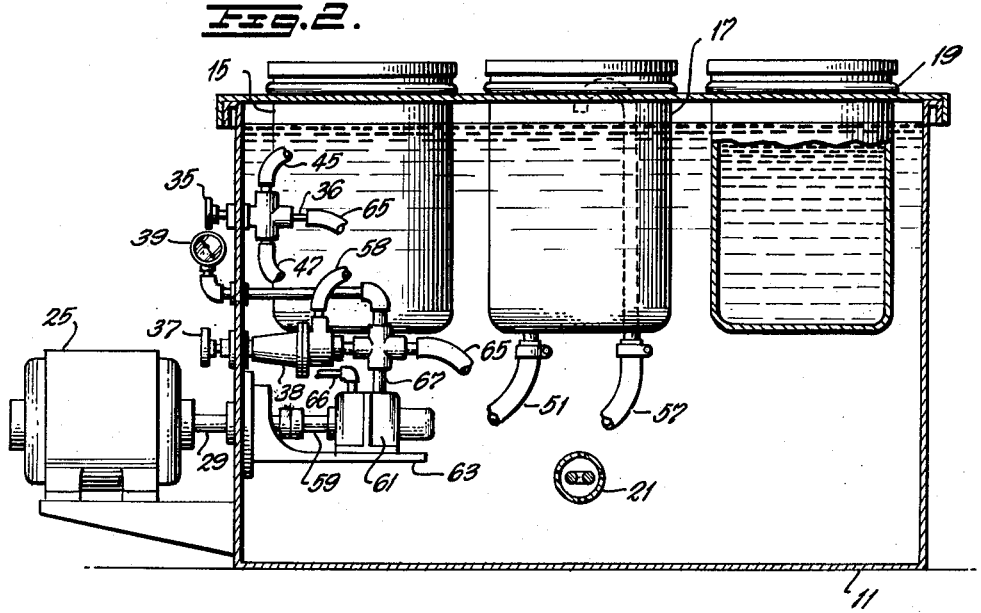
FIG. 2 is a longitudinal sectional view taken along the lines 2—2 of FIG. 1.
Figure 3:
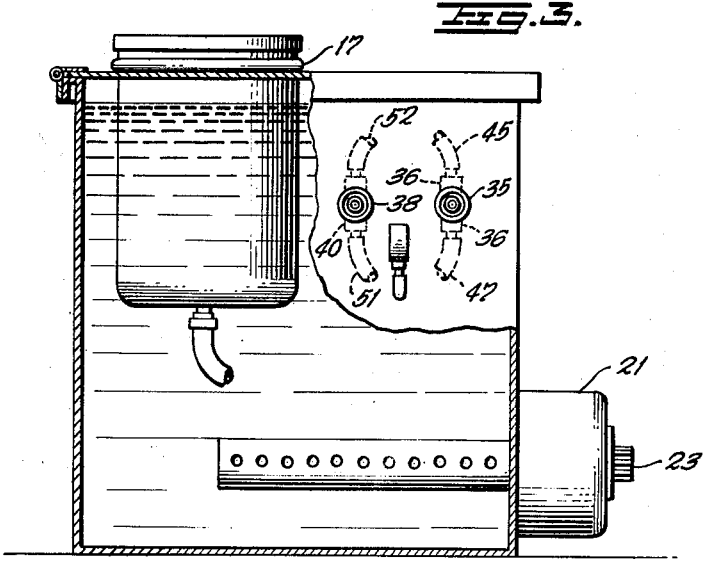
FIG. 3 is an end elevational view of the apparatus partially broken away.

FIG. 2 shows the more specific details of the inner portion of the tank 11 wherein the shaft 29 of the motor 25 is coupled to a shaft 59 of a fluid pump 61 which is mounted on a support member 63 secured to the side of the tank 11. The input of the pump 61 is connected to a conduit 66 with the output from the pump extending outwardly through conduit 67 to a four-way coupling. This four-way coupling, in addition to being connected to the pressure gauge 39, is also connected to an outlet conduit 65 and a bypass valve 38 which may be controlled by the knob 37. The details of the bypass valve will be discussed in more detail in connection with the showing of FIG. 5. FIGS. 2 and 3 illustrate two three-way valves 36 and 40 which are controlled respectively by the control knobs 35 and 33. Each of the three-way valves has three separate conduits connected thereto. The interior of the tank 11 is filled with water which is heated to the desired temperature. Since all of the valves and most of the conduits are immersed in the water together with the containers, all of the composition may be maintained at a constant temperature as it is being recirculated.

Figure 5:
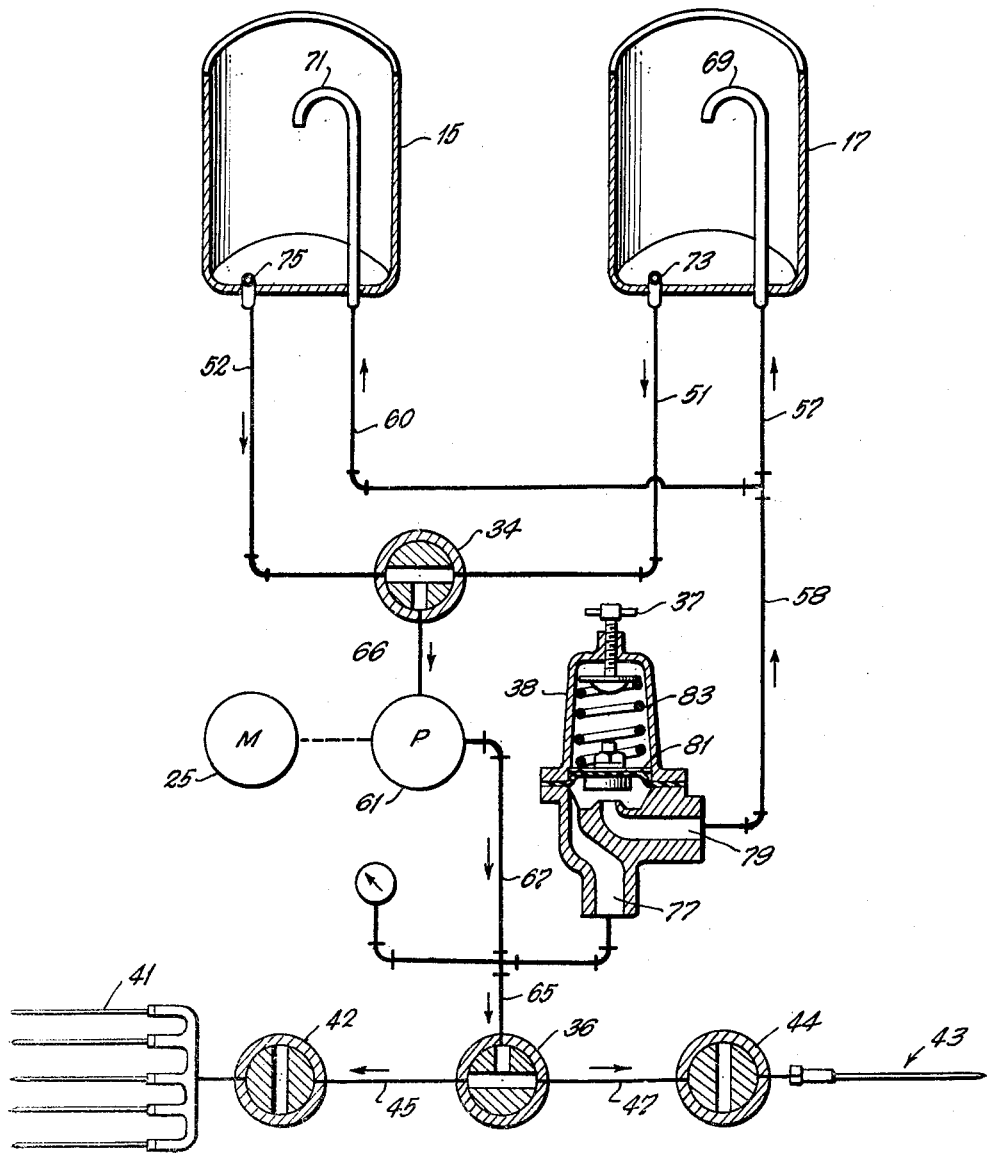
FIG. 5 is a schematic view of dual containers together with the various valves and pump controls used with the present invention.

Turning now to FIG. 5, a schematic illustration of the hydraulic control system and valves illustrates the containers 15 and 17 which have inlet conduits 69, 71 and outlet conduits 73 and 75. The remaining container 19 is used for a reserve supply of the fluid to be used in order that such a fluid at the proper temperature may be readily available in the event that the supply in the containers 15 and 17 becomes depleted.

Assuming that the manually controlled valves 42 and 44 of the stitch pumping needles 41 and 43 are closed as indicated in FIG. 5, the motor 25 drives the pump 61 which in turn draws fluid from both containers 15 and 17 through the conduits 51 and 52, a three-way valve 34, conduit 66 and expels the fluid under pressure through conduit 67 into the bypass valve 38. The fluid passes into the passage 77 in the bypass valve, upwardly into the valve and out of passage 79 into conduit 58 and from there returns to the tanks 15 and 17 by means of conduits 57 and 60.

However, in order that the fluid may be circulated in the manner described above, the pressure in the passage 77 and the conduit 67 must be in excess of that applied by the spring member 83 which bears against the valve member 81 tending to close off the passage 79. The adjusting knob 37 controls the relative tension on the spring member 83 and thus controls the pressure which must be built up by the pump 61 before circulation of the fluid may take place as described above. Therefore, the actual pressure in the line 67, and thus in the line 65 leading to the three-way valve 36, may be controlled by adjustment of the spring tension of the spring 83.

Thus it may be seen that with the valve 36 in the position as shown in FIG. 5, fluid is available to both the stitch pumping needles 41 and 43 under a pressure from conduit 65 which is equivalent to that required to open the valve 81.

The temporary opening of either one of the manual valves 42 and 44 either singly or simultaneously will immediately reduce the pressure in the passageway 77. Therefore, at any time that the valves 42 or 44 are opened and the solution is passed outwardly and through the stitch pumping needles 41 and 43, the reduced pressure will cause the valve 81 to lower and close off the passage 79. Accordingly, when the needles are in operation, there is no recirculation back into the containers and the fluid is forced under pressure through the needles.

This system works extremely well in any stitch pumping operation and particularly in a type designed to pump flavoring, tenderizer and fats into the sides of meat. In this type of treatment, the valves 42 and 44 are opened only for a short period of time for each pumping operation.

With all of the valves in the position in which they are shown in FIG. 5, the contents of both the containers 15 and 17 are constantly recirculated and the contents of both these containers are available to both of the stitch pumping needles 41 and 43. However, the use of the contents of but a single container may be selected by manually moving the position of the valve 34 to either one of the conduits 51 or 52 thus selecting one container for supplying the pump 61 through conduit 66. Additionally, the three-way valve 36 may also select a single conduit for the passage of fluid to but a single one of the stitch pumping needles if such an operation be desired.

A further advantage lies in the provision whereby with but one container, such as 15, supplying the fluid to but one of the needles, a reduction in the amount of fluid remaining in the container may be compensated by merely switching the valve 34 to a position as shown in FIG. 5 and the resultant recirculation of fluid during non-pumping intervals will tend to balance the remaining fluid between containers 15 and 17.

The use of the return conduit in the elevated position with the inverted U-shaped spout at the upper end of conduits 69 and 71 has proved to be extremely advantageous in using the present apparatus. This return not only provides and retains an emulsified solution, but also provides a means for either mixing the solution originally or heating and circulating a solution held in the solidified frozen state until it is ready to be used in the stitch pumping operation.

It has been found that any fluid containing fat, water, and tenderizing and flavoring ingredients which is to be used for stitch pumping of meat must be completely emulsified. One way for obtaining this emulsification would be to use a blender or such type apparatus. However, with the present apparatus, the adjustment of the spring tension 83 to provide a sufficient pressure allows the fat, water, flavoring and tenderizing solution to be placed into the containers 15 and 17 and the resultant pressure and recirculation through the conduits and the bypass valve 38 mixes and emulsifies the solution so long as the solution itself passes upwardly into the upper part of the containers 15 and 17 and is forced downwardly by a sufficient pressure to cause such an emulsification. This is the purpose and the result provided by the particular shape of the conduits 69 and 71 which, in effect, eliminate the need for an additional blending unit.

The present invention, therefore, provides apparatus for mixing, blending and emulsifying a solution for treating meat and which additionally retains such a mixture at the proper temperature and in a proper emulsified condition by recirculation. The invention further delivers fluid having the desired temperatures and pressures to the treatment means such as stitch pumping needles.

The foregoing description and drawings are to be considered illustrative of the present invention and not limitative in any fashion. Various modifications could be made by those skilled in the art within the scope of the present invention.

We claim:

1. Meat treating apparatus comprising a tank having a lid, a plurality of containers in said tank supported by said lid, means for heating the interior of said tank, an inlet conduit connected to each of said containers, an outlet conduit connected to each of said containers, a pump having an input coupled to said outlet conduits, a plurality of stitch pumping needles, an adjustable pressure controlled valve coupling the output of said pump to the inlet conduit of said containers for continuous recirculation of said fluid when the output of said pump reaches a predetermined pressure and a manually controlled valve between the output of said pump and said needles.

2. Mixing and pumping apparatus comprising a tank, a plurality of containers supported within said tank, inlet and outlet ports in each of said containers, a pump having its input coupled to said outlet ports, a normally adjustable closed pressure relief valve coupled to the output of said pump, means for coupling the outlet of said pressure relief valve to the input ports of said containers, a plurality of stitch pumping needles and a manually controlled valve coupling said needles coupled to the output of said pump.

3. The apparatus of claim 2 further comprising means for maintaining the interior of said tank at a predetermined temperature.

4. The apparatus of claim 2 further comprising a manually operable valve means coupling said pump to said outlet ports for connecting a variable number of containers to said pump.

5. The apparatus of claim 4 wherein said pump and said coupling means are enclosed within said tank and further comprising means for maintaining the interior of said tank at a predetermined temperature.

References Cited in the file of this patent

UNITED STATES PATENTS

| | | |
|---|---|---|
| 2,054,625 | Griffith | Sept. 15, 1936 |
| 2,392,197 | Smith et al. | Jan. 1, 1946 |
| 2,517,049 | Stevens | Aug. 1, 1950 |
| 2,547,481 | McDonald | Apr. 3, 1951 |
| 2,565,235 | Johnson | Aug. 21, 1951 |
| 2,692,798 | Hicks | Oct. 26, 1954 |
| 2,965,119 | Hawkinson et al. | Dec. 20, 1960 |
| 2,993,429 | Prohaska | July 25, 1961 |